No. 776,616. PATENTED DEC. 6, 1904.
G. RAINEY.
ADDING MACHINE.
APPLICATION FILED JAN. 15, 1904.
NO MODEL. 2 SHEETS—SHEET 2.

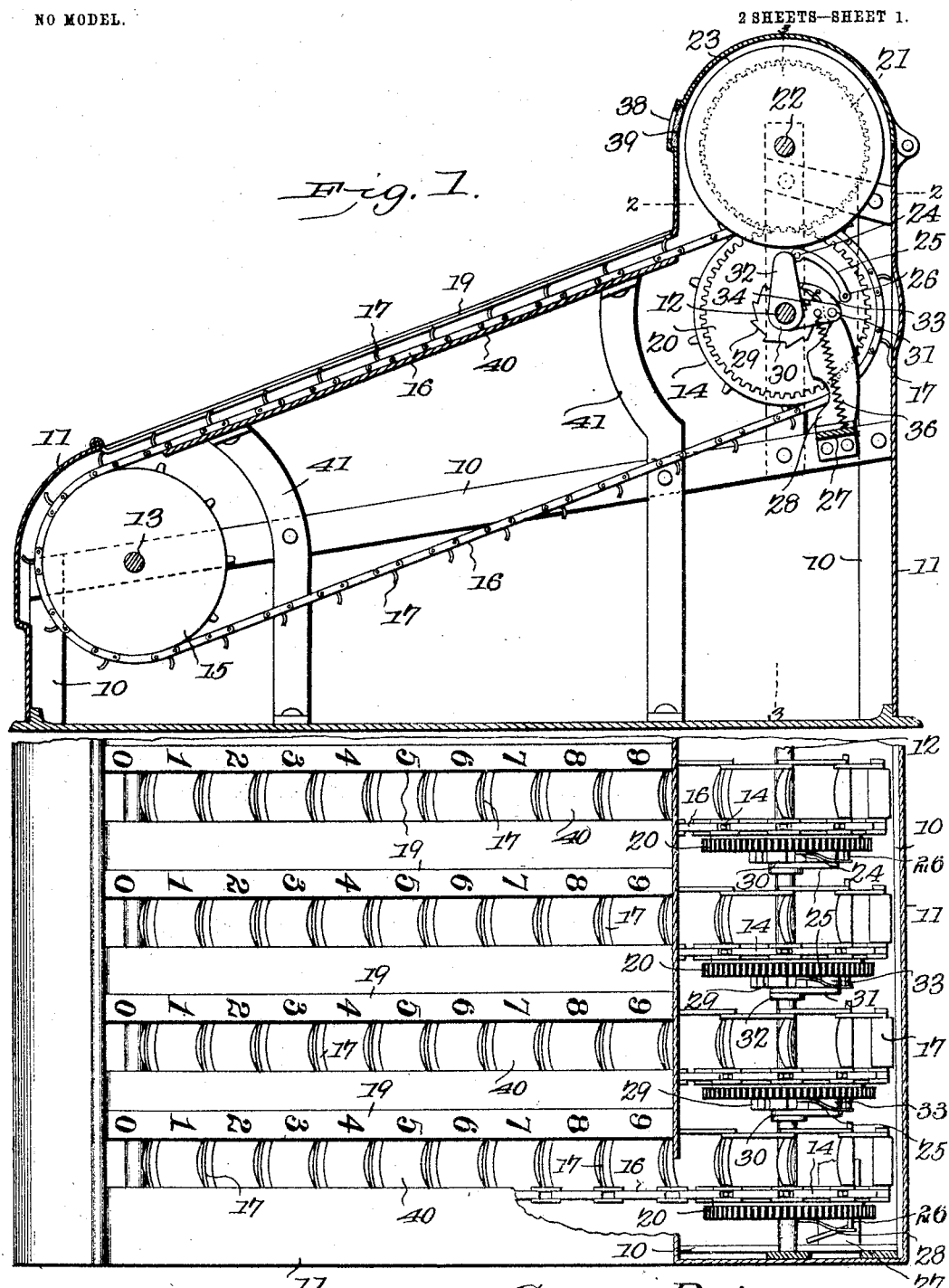

Witnesses
E. F. Stewart
C. N. Woodward

George Rainey, Inventor
by C. A. Snow & Co.
Attorneys

No. 776,616. Patented December 6, 1904.

UNITED STATES PATENT OFFICE.

GEORGE RAINEY, OF ENID, OKLAHOMA TERRITORY, ASSIGNOR OF ONE-HALF TO AUSTIN N. LEFFINGWELL, OF ENID, OKLAHOMA TERRITORY.

ADDING-MACHINE.

SPECIFICATION forming part of Letters Patent No. 776,616, dated December 6, 1904.

Application filed January 15, 1904. Serial No. 189,190. (No model.)

*To all whom it may concern:*

Be it known that I, GEORGE RAINEY, a citizen of the United States, residing at Enid, in the county of Garfield, Oklahoma Territory, have invented a new and useful Adding-Machine, of which the following is a specification.

This invention relates to improved devices for mechanically adding columns of figures, and has for its object to simplify and improve the construction and produce a device of this character which may be manufactured at comparatively small expense and containing few parts and which will operate efficiently and accurately.

With these and other objects in view the invention consists in certain novel features of construction, as hereinafter shown and described, and specified in the claims.

In the accompanying drawings, forming a part of this specification, and in which corresponding parts are denoted by like designating characters, is shown the approved embodiment of the invention capable of carrying the same into practical operation, it being understood that in practice various changes and modifications in the form, proportions, and minor details of construction may be resorted to without departing from the principle of the invention or sacrificing any of the advantages of the invention, and the right is therefore reserved of making all the changes which may fairly fall within the scope of the invention and the claims made therefor.

Figure 3:
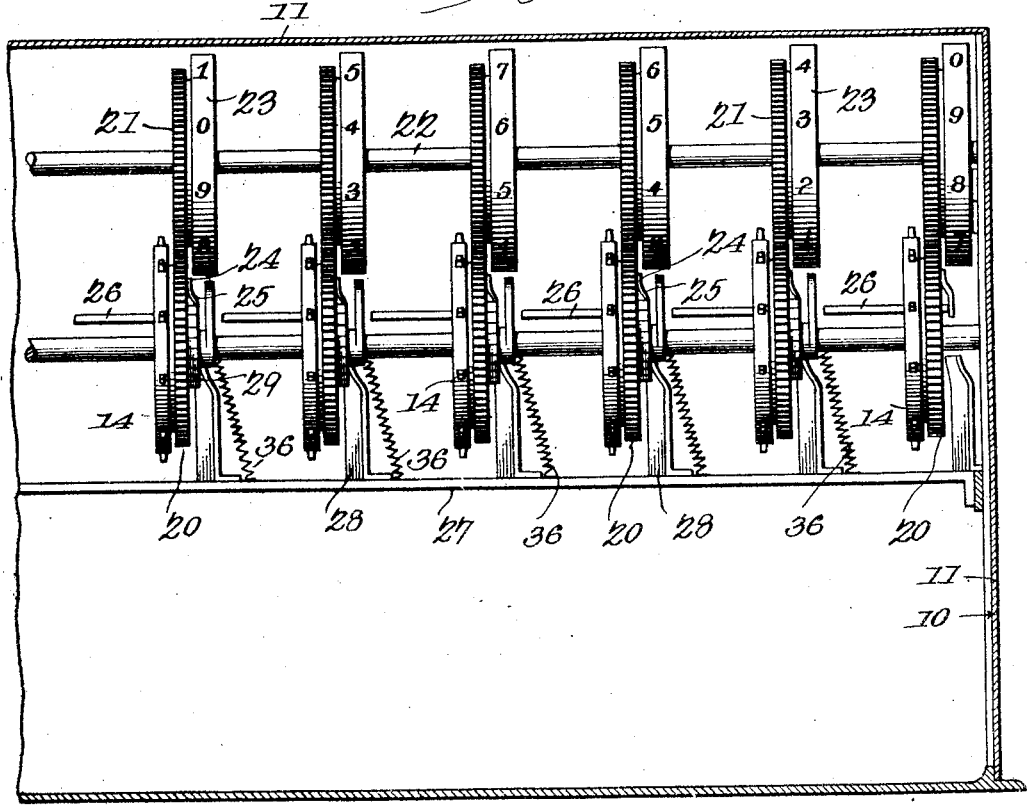
Figure 4:
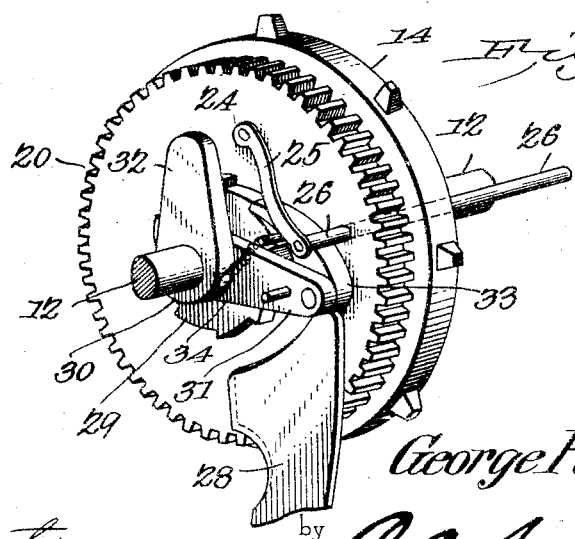

In the drawings thus employed, Figure 1 is a longitudinal sectional elevation. Fig. 2 is a plan view with the casing in section on the line 2 2 of Fig. 1. Fig. 3 is a front elevation with the chains removed and with the frame in section on the line 3 3 of Fig. 1. Fig. 4 is a perspective view, enlarged, of one of the chain-pulleys, gear-wheels, and ratchet-wheels, together with the contiguous tripping mechanism.

A supporting-framework 10 is provided of any approved form, but preferably of steel bars with a sheet-metal casing or inclosure 11. Transversely disposed in the frame 10 near its ends are shafts 12 13, held from turning therein with the shaft 13 at a lower point than the shaft 12, as shown. Mounted loosely upon the shaft 12 are a plurality of chain-wheels 14, spaced apart on the shaft, and similarly mounted for independent rotation upon the shaft 13 are a plurality of spaced chain-wheels 15, corresponding to the wheels 14 on the shaft 12 and connected thereto by endless chains 16. The chain-wheels will each be provided with a predetermined number of teeth or sprockets, (preferably ten,) and the links of the chains will correspond therewith, so that a certain predetermined movement of the chains will rotate the chain-wheels a distance corresponding therewith. The chains are each provided with laterally-extended finger-holds 17, and beneath these portions guard-plates 40 are supported by brackets 41, extending to the frame 10, as shown.

Connected to the frame 10 contiguous to the finger-holds 17 of the chain 16 are bars 19, having graduations corresponding to the links of the chain and the teeth of the chain-wheels 14 15.

Connected to each of the chain-wheels 14 is a gear-wheel 20, each gear engaging corresponding gears 21, loose upon a counter-shaft 22, supported upon the frame 10, as shown. Each of the gears 21 has a drum 23 attached thereto and provided with graduations from "0" to "9" upon its periphery, the graduations corresponding to the links of the chains 16 and the graduations upon the bars 19. The gears 20 21 are of the same size or possess the same number of teeth, and by this arrangement it will be obvious that any movement of the chains 16 will move the drums 23 to the same extent, as hereinafter explained. The inclosing casing 11 is provided with a longitudinal aperture 38, preferably covered with glass 39, through which the numerals upon the drums 23 in transverse alinement may be read, as hereinafter explained.

Attached by one end, as at 24, to each of the wheels 14 or to its gear 20 is a spring 25, with a pin 26 extending from its free end through the wheel, to which it is attached, and projecting from its opposite side, as shown.

Extending across the framework 10 beneath the wheels 14 is a bar 27, having spaced cams 28 extending upward therefrom into the paths of the springs 25 as the wheels are rotated, the springs 25 being normally disposed so that their free ends stand outward from the adjacent faces of their respective wheels a sufficient distance to provide for a certain degree of longitudinal movement to the pins 26 when the springs are engaged by the cams, as hereinafter explained.

Attached rigidly to each of the gears 14, except the one at the extreme right, is a ratchet-wheel 29, and mounted for oscillation upon the shaft 12 adjacent to each ratchet-wheel is a sleeve 30, each sleeve having arms 31 32 extending radially therefrom. The arms 31 are each provided with a pawl 33, engaging its respective ratchet-wheel and held yieldably in position by a spring 34, while the sleeves 30, with their attachments, are held yieldably in position relative to the shaft 12 and against stationary stops by springs 36, connected to some stationary portion of the device—as, for instance, the bar 27, as shown. The stationary stops to support the arms 32 may be extensions from the cams 28, if preferred. The arms 32 extend into the paths of the pins 26 when the latter are projected by the action of the springs 25 when they engage the stops 28, as hereinafter shown.

The casing 11 will preferably be of sheet metal of any desired quality and ornamented or protected in any desired manner.

The casing will cover all parts except the upper bights or lengths of the chains 16 and of the bars 19, so that no parts of the mechanism will appear to view except the above-noted portions of the chains and the small portions of the graduated drums 23, which for the time being are in view through the glass-covered aperture 38.

Any required number of the sets of wheels, chains, and drums may be employed; but for the purpose of illustration four are shown, representing a machine of capacity to add a column of figures extending to four places or into the thousands; but it is obvious that the machine may be increased or decreased in this respect practically to an indefinite extent.

By this simple arrangement of parts any number of numerals may be added by merely moving the endless chains and setting them in certain predetermined positions relative to the graduated bars 19.

To illustrate the operation, suppose the numerals "1987" are to be added to the numerals "3755." The fingers of the operator are placed upon the finger-holds 17 opposite the numerals on the bars 19 corresponding to the upper set of numerals to be added (in the illustration "1987") and the several chains drawn down until the respective finger-holds are all opposite the ciphers on the bars 19—that is to say, that the fingers of the operator are engaged with the finger-holds 17 of the chains, which for the time being are found opposite the numerals "1987" on the bars 19 from left to right and all the chains pulled down until the specific finger-holds are all in transverse alinement opposite the ciphers of the bars. Thus the first chain will be moved the distance of seven links, the second chain will be moved eight links, the third chain will be moved nine links, while the last chain to the left will be moved only one link. The effect of this is to correspondingly move the drums 23 so that the same numerals "1987" appear in order behind the glass cover 39, as will be obvious. It is immaterial how the chains are moved relatively or in what order, as the results are the same upon the drums 23, no matter in what order the chains may be operated. In thus operating the chains the stop-plates 40 serve an important purpose, as they not only prevent the sagging of the chains, but also prevent the fingers of the operator from protruding too far through the apertures in front at the hand-holes and insure an easy action and operation of the chains. The inclining of the chains in the manner shown is also an important advantage in this respect, as the operation is easier to the operator and enables him to more readily read the numerals upon the bars 19 and locate the chain finger-holds relatively thereto with greater certainty and accuracy. The fingers of the operator are then placed upon the finger-holds 17 in the same manner opposite the numerals on the bars 19 corresponding to the second series of numerals to be added (in the illustration "3755") and the several chains drawn down until all the respective finger-holds are again opposite the ciphers. The result of this is to move the first or unit drum 23 five places, and as the unit-drum has already been moved seven places it will be moved twelve spaces in all, or one and two-tenths revolutions, and show the numeral "2" at the opening 38. As the sprocket-wheel 14 at the unit end of the machine is about to complete a revolution the spring 25 will engage the first of the cams 28 and will be forced inward in the path of the arm adjacent to the second or tens wheel 14, with the result of causing the pawl 34 of that particular member to engage the ratchet-wheel of the tens-wheel and move it forward one-tenth of a revolution and cause the numeral "9" to appear at the opening 38, (as this drum has been set to show the numeral "8" at the previous action of the tens-chain,) and then when the second chain is actuated to draw the finger-hold 17 opposite the numeral "5" on its bar 19 to zero the second drum will be moved five more spaces, or fourteen in all, showing the numeral "4" at the opening 38. Then the movement of the remaining chains in the same manner relative to the remaining numerals "7 3" will cause the numerals "7 5" to appear at the opening 38 or expose to view the numerals "5742"—the sum of the numerals "1987" and "3755." By this arrangement of parts the second action of the chains moves the drums 23 the number of spaces corresponding to the spaces which the chains are moved plus one-tenth, or one space, and with a movement equal to the total number of spaces or links of the chains moved at both actions plus one-tenth, or one space, which additional one-tenth provides for mechanically carrying forward the remainders in order when remainders occur. When two or more movements of the same chain do not exceed nine links, then the spring 25 on that particular wheel is not affected by the stop 28, as there will be no remainder unless the combined movements exceed nine, as will be obvious.

It will be obvious that any set of numerals may be accurately added with absolute correctness and very expeditiously by merely drawing down the chains certain predetermined distances and reading the results at the aperture 38.

It will be noted that the cams 28 are to be wide enough at their free ends to hold the springs 25 compressed just long enough to cause the pins 26 to hold the pawls engaged with their respective ratchets only during one-tenth of a revolution for obvious reasons.

The construction of the chain is such that lubrication of the chains and the wheels with which they mesh is permitted without danger of soiling the fingers from contact with the lubricated portion of the chain. It will be observed on reference to Fig. 2 that that portion of the chain which engages with the teeth of the wheels is wholly concealed by the cover-plate, the laterally-extending bars or finger-holds 17 being only exposed at the slots of the finger-plate.

The casing may be in any fanciful or ornamental design to present a pleasing appearance, and the members 19 and 23 will be formed of material which will enable the numerals to be readily discerned by the operator.

Having thus described the invention, what is claimed is—

1. In a calculating-machine, spaced chain-wheels arranged to move indicating or registering devices, laterally-extended finger-bars carried by the chain, and a casing covering and concealing the chain and having slots to expose the finger-bars.

2. In a calculating-machine, spaced chain-wheels arranged to operate indicating or registering devices, chains passing over said wheels, a casing for covering and shielding that portion of the chain which travels over the wheels, and finger-bars projecting laterally from the chain, the casing being slotted to expose said finger-bars.

3. In a calculating-machine, a pair of chain-wheels arranged to operate indicating or recording devices, an endless chain comprising a pair of sets of jointed links arranged in parallel relation, one set of links being adapted to engage the teeth of the wheels, finger-bars connecting the two sets of links, and a casing having a slot exposing the finger-bars and shielding the links which engage the chain-wheels.

4. In a calculating-machine, a pair of chain-wheels arranged to operate indicating or registering devices, a chain connecting said wheels, finger-bars extended laterally from the chain, a casing slotted to expose the finger-bars, and a supporting-strip for holding said finger-bars in position in the slot.

5. In a calculating-machine, chain-wheels, chains connecting the same and arranged for engagement by the fingers, shafts on which the chain-wheels are loosely mounted, a gear and a ratchet-wheel secured to each of one set of chain-wheels, disk or drums, gears secured thereto and intermeshing with the gears of the chain-wheels, a bell-crank lever mounted loosely on the shaft adjacent to each ratchet-wheel, a pawl carried by one arm of said bell-crank lever, a pin carried by each gear and chain-wheel and adapted to engage the bell-crank lever of the next adjacent wheel, a spring connected at one end to the pin and at the opposite end to the gear of the chain-wheel, a stationary cam with which said spring engages once during each revolution of the chain-wheel, and a stop for limiting movement of the bell-crank lever.

In testimony that I claim the foregoing as my own I have hereto affixed my signature in the presence of two witnesses.

GEORGE RAINEY.

Witnesses:
GUY S. MANATT,
J. D. MINTON.